(No Model.) 2 Sheets—Sheet 1.
G. H. HULETT.
CAR DUMPING MECHANISM.
No. 558,178. Patented Apr. 14, 1896.
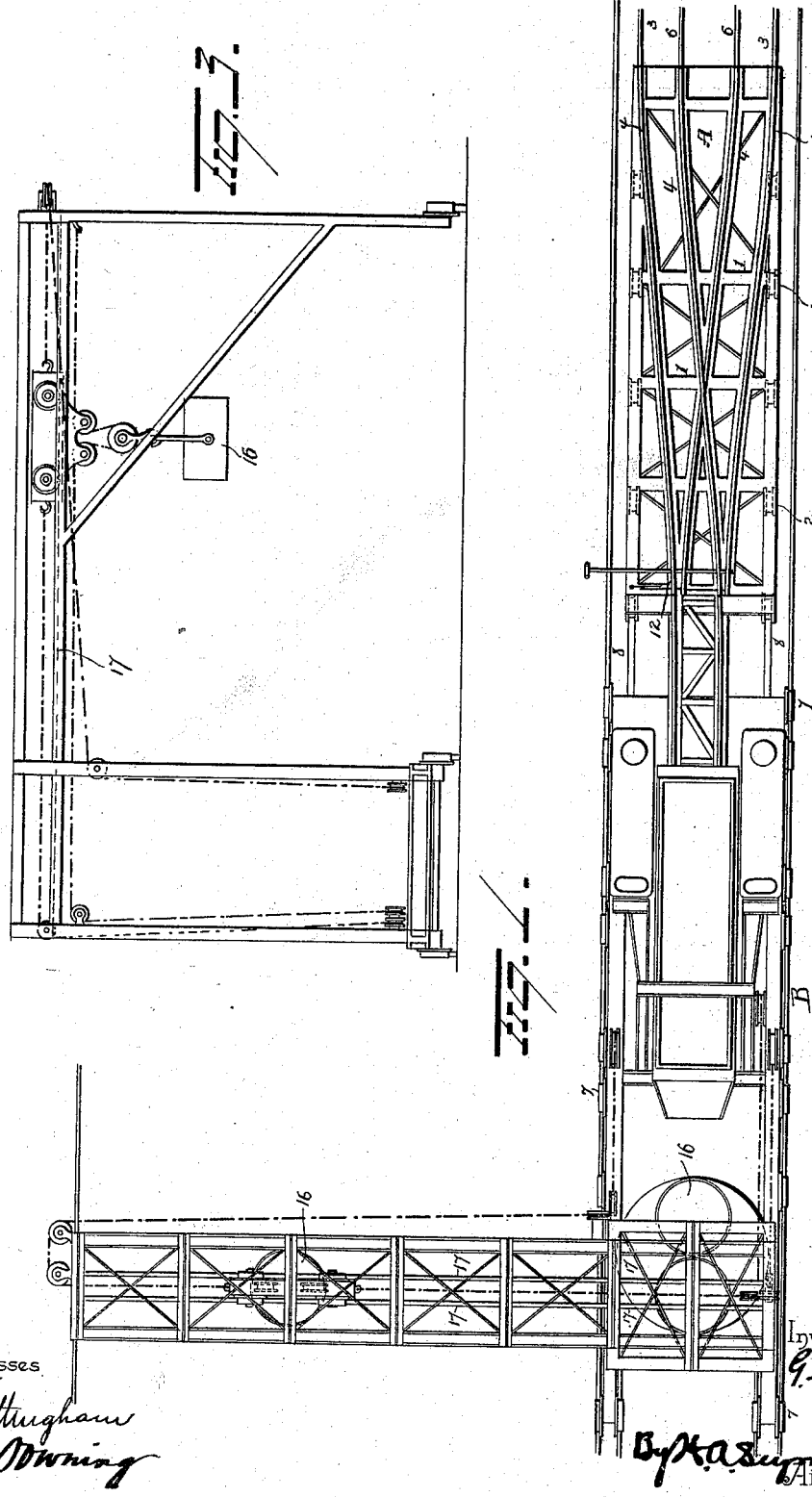
Witnesses
E. J. Nottingham
G. F. Downing
Inventor
G. H. Hulett
By H. A. Seymour
Attorney

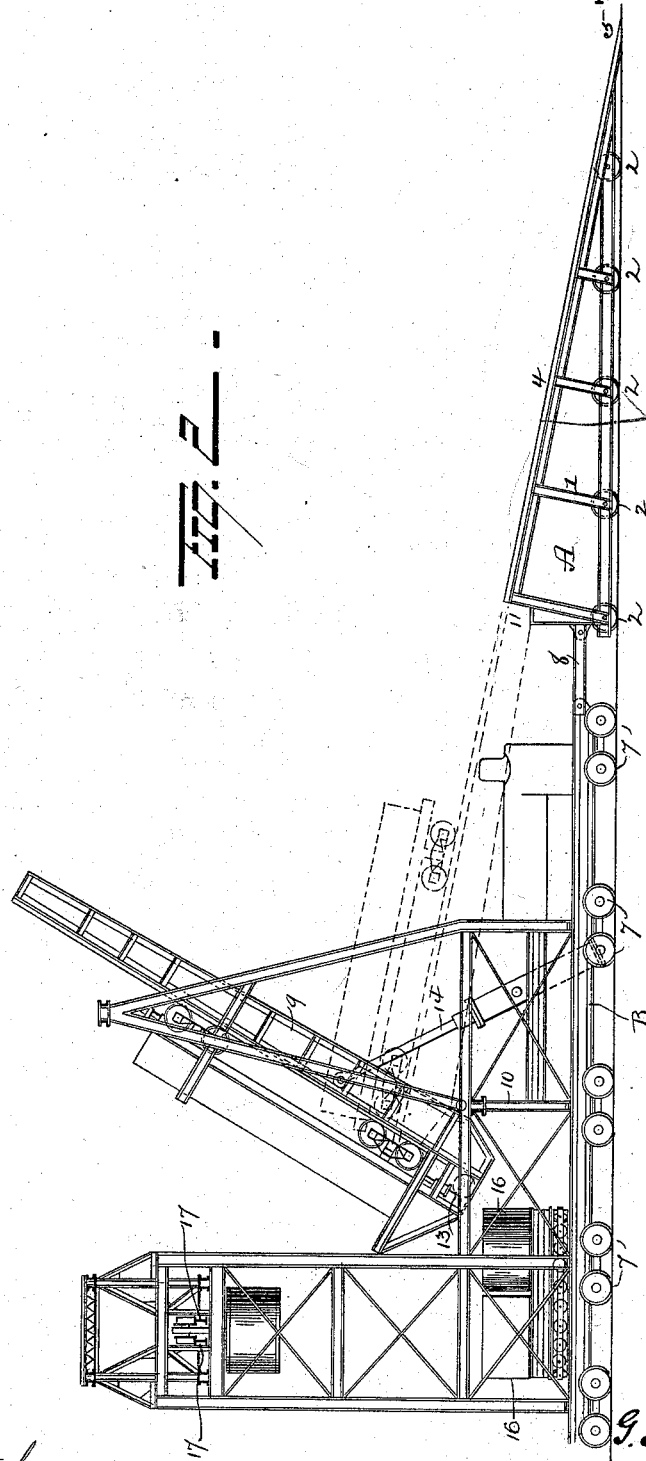

UNITED STATES PATENT OFFICE.

GEORGE H. HULETT, OF CLEVELAND, OHIO.

CAR-DUMPING MECHANISM.

SPECIFICATION forming part of Letters Patent No. 558,178, dated April 14, 1896.

Application filed January 5, 1895. Serial No. 533,951. (No model.)

*To all whom it may concern:*

Be it known that I, GEORGE H. HULETT, of Cleveland, in the county of Cuyahoga and State of Ohio, have invented certain new and useful Improvements in Portable Switching Apparatus; and I do hereby declare the following to be a full, clear, and exact description of the invention, such as will enable others skilled in the art to which it appertains to make and use the same.

My invention relates to an improvement in portable switching apparatus for car-dumping machines, and the object is to avoid the slow and laborious practice heretofore followed of switching out each empty car; and to this end it consists in a portable switching apparatus, connected to the car-dumping machine, of sufficient length to have a switch thereon, so that in the act of running a car up upon the dumping-machine and lowering it therefrom again it is switched from the track having the loaded cars thereon to the track for empty cars; and it further consists in certain novel features of construction and combinations of parts, which will be hereinafter described, and pointed out in the claims.

In the accompanying drawings, Figure 1 is a plan view. Fig. 2 is a view in side elevation, and Fig. 3 is a view of the elevated track.

A represents a portable trestle or approach, comprising a frame 1, mounted on wheels 2 2, which travel on rails 3 3, and having an inclining upper surface, as shown in Fig. 2. Rails 4 4 are placed upon the upper surface of the portable trestle or approach, their lower ends being beveled on their lower faces 5 5 to rest upon the treads of rails 3 3 and 6 6 to form a continuation of the track at the point where the trestle is placed to direct the car being elevated upon the trestle from the track for loaded cars or to lower it gently upon the track for empty cars when its load shall have been discharged.

B is the truck of the car-dumping machine, it being mounted on suitable wheels 7 7, which travel upon the track-rails, as shown in both figures. This truck and the trestle or approach are connected together in any suitable manner—as, for instance, by links 8 8. The platform 9 is pivoted to the frame 10 of the truck in such manner that it constitutes a continuation of the trestle or approach when in its lowered or normal position, as shown in Fig. 2, and also it serves as an abutment for the trestle, its free end first reaching and filling the space intervening between its pivotal support and the trestle and resting upon the shoulder 11, formed on the latter, as indicated in dotted lines in Fig. 2. A switch 12 is shown and by preference located on the trestle or approach, as well as some approved hand, or it might be automatic, means for operating it. This switch might be constructed in a variety of ways to direct the car upon the other track in its descent. A cable 13 is coupled to the loaded car, and the engine on the truck is set in motion to raise the car from the track up upon the trestle or approach onto the pivoted platform. The platform is then tilted, as heretofore, by means of the mechanism 14, disclosed in Patent No. 516,053, granted to me March 6, 1894, and the car is dumped into the boat direct, into a chute or other receptacle. The platform is then lowered and the car is directed by the switch to the other track, or the track for empty cars, from which they may be removed at any time. Heretofore much switching has been required to accomplish this after the cars reached the track-bed again, which necessitated a great deal of unnecessary shifting and switching, requiring space and time. By this invention it is entirely obviated.

In addition to the features described I have devised a turn-table on which buckets 16 16 are placed to receive the material from the car as the latter is dumped. An elevated track 17 is provided for conducting the buckets off to the place where the contents are to be discharged, and the arrangement is such that two or more buckets may be placed on the turn-table at a time, and one may be filled while another is being conducted away, and so on.

The entire apparatus may be shifted along the track, as desired, by its own engine or in any other manner, as the case may be.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. The combination with a truck and a platform pivoted thereto, of a portable trestle or approach, tracks on each of said parts, a double track on the trestle or approach, and a switch on one of said parts for transferring a car from one track on the trestle or approach to the other, substantially as set forth.

2. The combination with a truck, and a portable trestle coupled thereto and movable therewith, of a platform pivoted to the truck to form a continuation of the trestle and dump the car while on said platform, and tracks and switch on the platform and trestle respectively for transferring a car raised and lowered thereupon from one track to the other, substantially as set forth.

3. The combination with a truck and a platform pivoted thereto, of a portable trestle adapted to be coupled to the truck, said trestle having a shoulder thereon on which one end of the platform is adapted to rest when in its lowered position whereby the platform constitutes a continuation of the trestle when in its normal position, substantially as set forth.

4. The combination in a dumping-machine, of a turn-table adapted to receive buckets to be filled from the dumping-machine and means for hoisting and conveying away these buckets, substantially as set forth.

5. A portable dumping-machine consisting of a framework supported in suitable trucks, a tilting platform, a hoisting device and lateral track upon which the hoisted load is conveyed away, substantially as set forth.

6. The combination with a truck and a platform pivoted thereto, said platform having tracks thereon of a movable approach, said approach having tracks thereon adapted to form continuations of the tracks on the platform, substantially as set forth.

In testimony whereof I have signed this specification in the presence of two subscribing witnesses.

GEORGE H. HULETT.

Witnesses:
  H. H. McKeehan,
  Morris Black.